A. T. DAWSON & G. T. BUCKHAM.
GUN MOUNTING.
APPLICATION FILED NOV. 12, 1914.

1,152,079.

Patented Aug. 31, 1915.
8 SHEETS—SHEET 1.

Witnesses:

Inventors:
Arthur Trevor Dawson
& George Thomas Buckham
By Pennie Davis & Goldsbrough
Attys.

A. T. DAWSON & G. T. BUCKHAM.
GUN MOUNTING.
APPLICATION FILED NOV. 12, 1914.

1,152,079.

Patented Aug. 31, 1915.

A. T. DAWSON & G. T. BUCKHAM.
GUN MOUNTING.
APPLICATION FILED NOV. 12, 1914.

1,152,079.

Patented Aug. 31, 1915.
8 SHEETS—SHEET 3.

A. T. DAWSON & G. T. BUCKHAM.
GUN MOUNTING.
APPLICATION FILED NOV. 12, 1914.

1,152,079.

Patented Aug. 31, 1915.
8 SHEETS—SHEET 4.

A. T. DAWSON & G. T. BUCKHAM.
GUN MOUNTING.
APPLICATION FILED NOV. 12, 1914.

1,152,079.

Patented Aug. 31, 1915.
8 SHEETS—SHEET 6.

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

GUN-MOUNTING.

1,152,079.  Specification of Letters Patent.  Patented Aug. 31, 1915.

Application filed November 12, 1914. Serial No. 871,676.

*To all whom it may concern:*

Be it known that we, Sir ARTHUR TREVOR DAWSON, knight, and GEORGE THOMAS BUCKHAM, both subjects of the King of Great Britain, residing at Vickers House, Broadway, Westmister, in the county of London, England, have invented certain new and useful Improvements in or Relating to Gun-Mountings, of which the following is a specification.

This invention relates to gun mountings of the naval type adapted to be placed in a casemate or on an upper deck, the said mountings being of such a character that the elevating and training number or numbers (that is, the member or members of the crew for elevating and training the gun) are situated adjacent to the gun trunnions which are located well in advance of the breech and are carried by a cradle in which the gun recoils on firing. In such mountings it is usual for the carriage to be provided with a shield and for the elevating and training number or numbers to occupy a position contiguous to the gun trunnions and between the carriage side cheeks and the inner wall of the shield with the result that the latter requires to be of sufficient diameter or width to provide the necessary space for the number or numbers.

An important feature of our invention resides in the fact that the mounting is so constructed and arranged that the diameter or width of the shield can be reduced to such an extent that it does not materially exceed the maximum distance between the carriage side cheeks, the elevating and training number or numbers being situated in a position between these side cheeks and beneath the level of the gun trunnions, which position they occupy at all angles of elevation of the gun. The side cheeks extend downward and may terminate in a chamber which passes through the deck and is supported by a bearing attached to the deck, the said chamber constituting an annular pivot which moves with the gun during training. The actuating gears of the elevating and training mechanism and the eye piece of the sighting apparatus are situated between the said side cheeks and beneath the gun or guns.

Our improved mounting in addition to effecting a material reduction in the diameter of the shield of a casemate mounting and in the width of the shield in an upper deck mounting also enables the elevating mechanism to be arranged to act upon the gun cradle through mechanism situated centrally beneath the gun, the said mechanism preferably comprising an elevating rack attached to the cradle beneath the axis of the gun; in this manner the necessity for the usual side bars is avoided. Furthermore the elevating and training hand wheels and the sights can be placed beneath the level of the gun trunnions, and as the minimum distance between these parts is only limited by the lateral space occupied by the elevating and training numbers and by the width of the elevating rack, the sights can be placed in such a position that in a casemate mounting large deflections of the sight can be effected at extreme angles of training and a large maximum angle of training can be attained with a small diameter of shield without "wooding" the sights that is to say without the vision through the sights being obscured by the side armor of the ship. The fact of the elevating and training numbers (when two such numbers are employed) being in close proximity to one another enables them to readily communicate verbally with each other when desired.

We may adapt the aforesaid mounting to carry two or more guns, for which purpose the carriage is provided, in addition to the two side cheeks, with one or more center plates which together with the side cheeks receive the trunnions of the guns. With the sights arranged beneath the level of the trunnions as aforesaid, a large arc of training can be obtained without "wooding" which result would not be possible in the casemate mountings heretofore constructed if two or more guns were mounted therein. Furthermore a much smaller shield can be employed than would be required in a casemate or upper deck mounting carrying two or more guns and constructed on the principle heretofore adopted.

The sight brackets may be pivotally mounted on the gun cradle trunnions in a position between the carriage cheeks and the gun cradle, the sight carriers being connected to the said brackets by deflection pivots as is well understood. The whole of the sighting apparatus may be arranged at the forward part of the gun cradle beneath the trunnions, the sight setter then occupying a position between the carriage cheeks instead of near the breech end of the gun as is customary. The sight brackets, instead of being pivoted on the gun trunnions, may be pivoted to a part such as the elevating rack moving with the cradle, at a point beneath the forward part of the gun cradle.

In order that the said invention may be clearly understood and readily carried into effect we will describe the same more fully with reference to the accompanying drawings, in which:—

In these figures A is the gun, B, B are the side cheeks of the carriage and C is the shield.

Referring more particularly to Figs. 1 to 9, the side cheeks of the carriage are extended downward to about the level of the deck, the distance between the cheeks at the lower part being somewhat greater than at the upper part, and these side cheeks merge into a cylindrical chamber B′ which passes through a suitable bearing B² connected to the deck B³, the chamber being supported in the bearing in any appropriate manner, such as by a number of balls or rollers to facilitate training. The said chamber may as shown be provided with seats $b$, $b'$ (Figs. 1 to 3) for the elevating and training numbers respectively and with a floor plate $b^2$ so that elevating and training can be effected either from a sitting or a standing position as desired.

Figure 10:
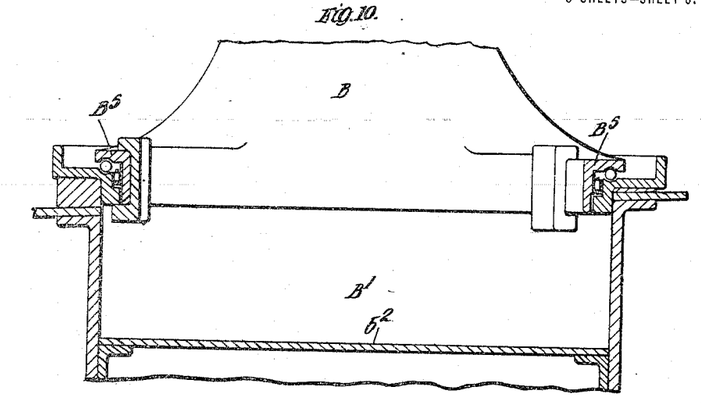
Figs. 10 and 11, are a diagrammatic sectional elevation and a diagrammatic plan showing another modified form of mounting.
Figure 11:
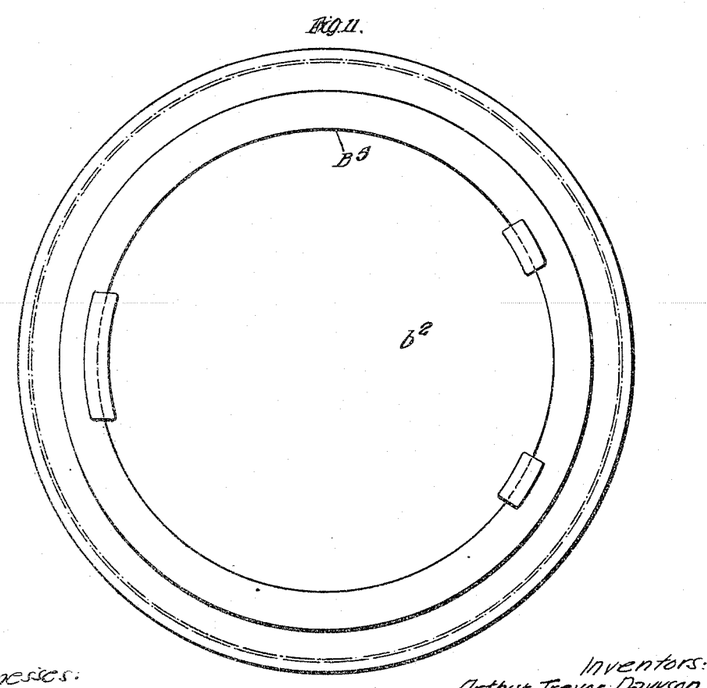

In the above mentioned constructions the upper parts of the bodies of the elevating and training numbers are protected laterally by the side cheeks B, B of the carriage, as well as to a large extent (in a casemate mounting) by the side armor of the ship, while their lower extremities are protected by the wall of the chamber as well as by the side armor. In place of the aforesaid rotary chamber we may employ a simple platform which might be provided with or rotatably mounted upon a pivot of suitable formation, or as shown in Figs. 10 and 11 the chamber may be stationary. Training may be effected by connecting the training handle or hand wheel $b'^x$ through gearing to a pinion $b^{2x}$ (Figs. 3 and 5) carried by one of the side cheeks or by the chamber and engaging with a fixed rack $b^{3x}$. The gun is elevated by the handwheel $b^x$ through a pinion gearing with an elevating rack $B^x$ arranged centrally beneath the gun cradle.

In Figs. 1 to 3, and Figs. 5 and 6, the sight brackets D are pivotally mounted on the gun trunnions D′ in a position between the carriage cheeks B, B and the gun cradle. The telescopes are mounted in the carriers $D^2$ in such a position that their eyepieces normally occupy a position approximately beneath the axis of the gun cradle trunnions. The sight brackets may be cross connected in any suitable manner such as by a frame of triangular shape in plan. It will be observed from Fig. 3 that the sight brackets move about an axis which is at a small angle to the axis of the trunnions, this arrangement providing an automatic correction for drift as is well understood. In sighting apparatus heretofore proposed the sight has been pivoted on trunnions which were either arranged external to the cheeks of the carriage or were pivoted in the cradle trunnions, with the result that trunnions projected beyond the cheeks of the carriage and these cheeks had to be cut away at the rear as far as their outer surface in order to allow the gun and cradle together with the sights to be run in-board for housing. This is avoided with our improved sighting apparatus, since the trunnions need not project through the side cheeks and the latter need therefore only be recessed at the rear to enable the gun and cradle together with the sights to be housed. Furthermore the distance between the sights is reduced owing to the sight pivots being close to the cradle and between the cheeks of the carriage. With the resultant reduction in the diameter of the shield the total length of the sighting apparatus is considerably reduced it being clear that the larger the diameter of the shield the more must the sight bracket be extended rearwardly to prevent the adjusting handwheels from fouling the wings of the armor. The telescopes are also much better protected than hitherto, owing to the fact that they are mostly inside the cheeks of the carriage, whereas in previous arrangements they have been outside the cheeks of the carriage. Instead of employing two cross-connected sights we may use only one sight which would preferably be placed immediately beneath the cradle; in this case the mounting could be operated by one gun layer who would perform both the training and elevating operations.

Figure 1:
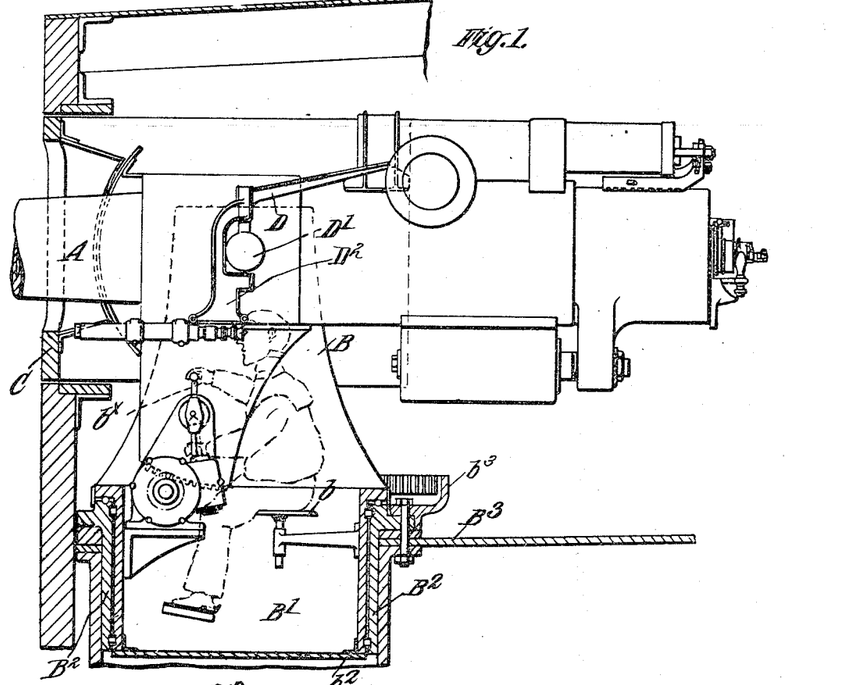
Figures 1, 2 and 3, are a sectional side elevation, a sectional plan and a sectional rear elevation showing more or less diagrammatically a constructional form of a casemate mounting carrying a single gun.
Figure 2:
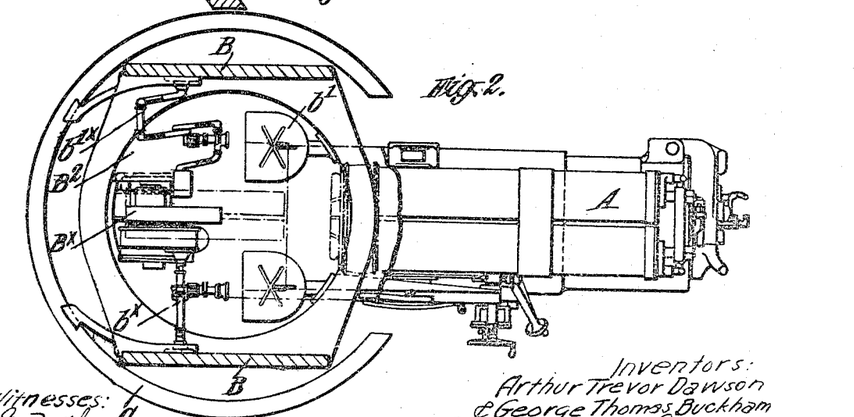
Figure 3:
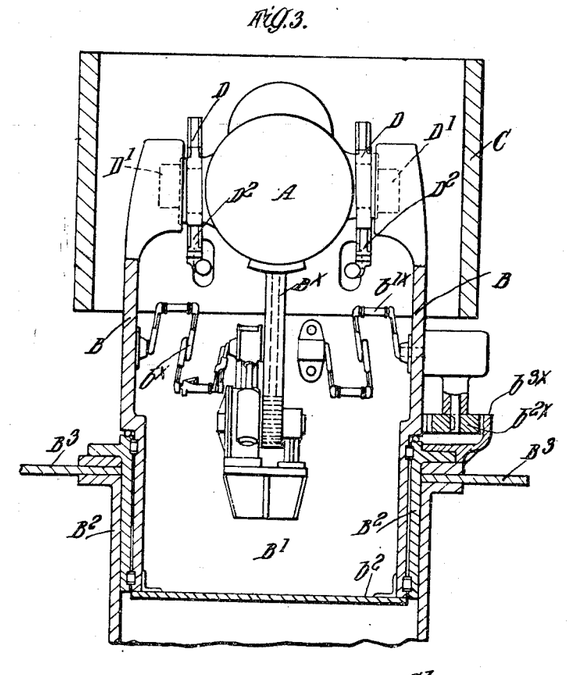
Figure 4:
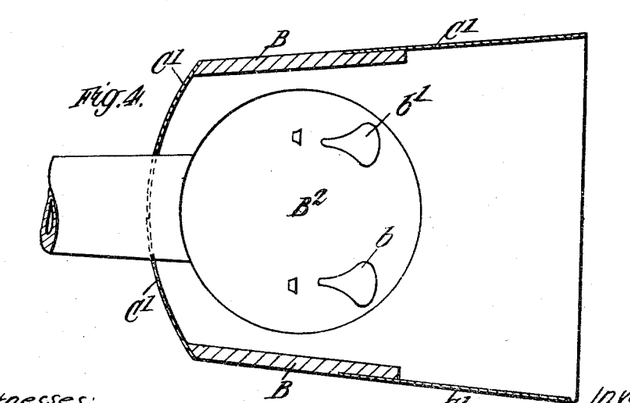
Fig. 4 is a diagrammatic plan of an upper deck mounting carrying a single gun.
Figure 5:
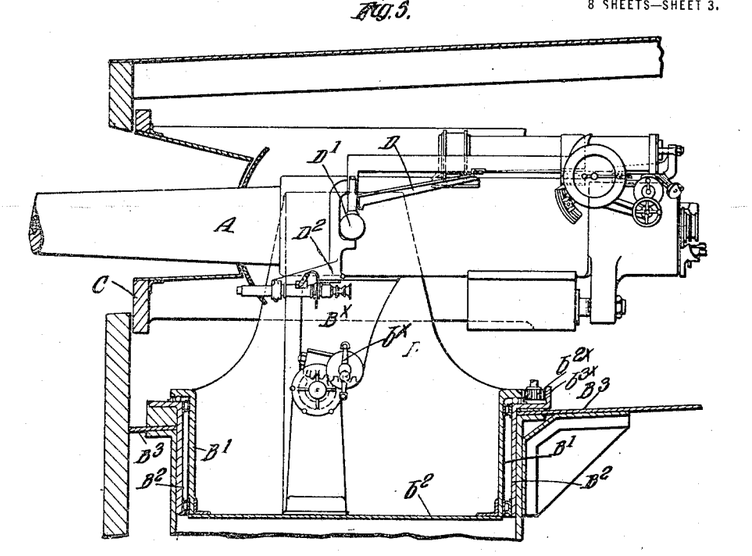
Figs. 5 and 6 are views similar to Figs. 1 and 2 showing a form of mounting adapted to carry two guns.
Figure 6:
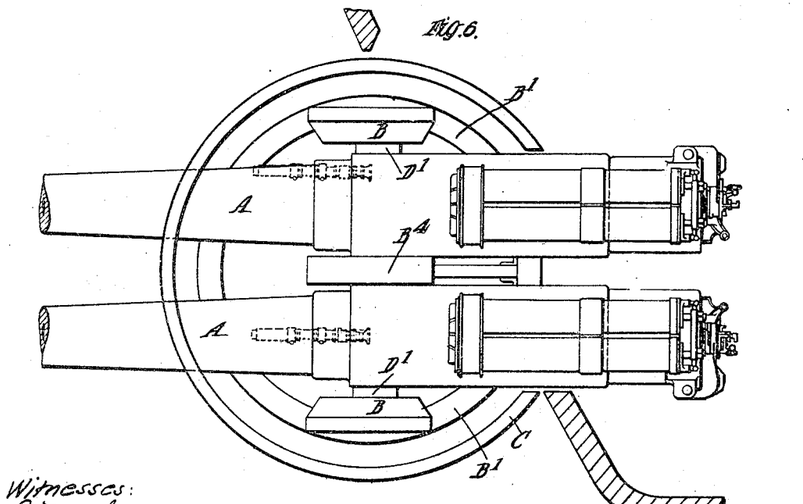
Figure 7:
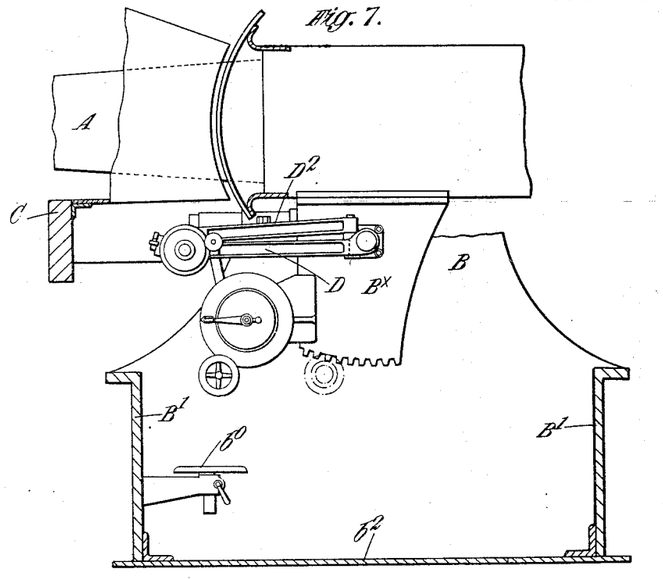
Figs. 7, 8 and 9, are views similar to Figs. 1, 2 and 3 showing a modified form of mounting adapted to carry two guns.
Figure 8:
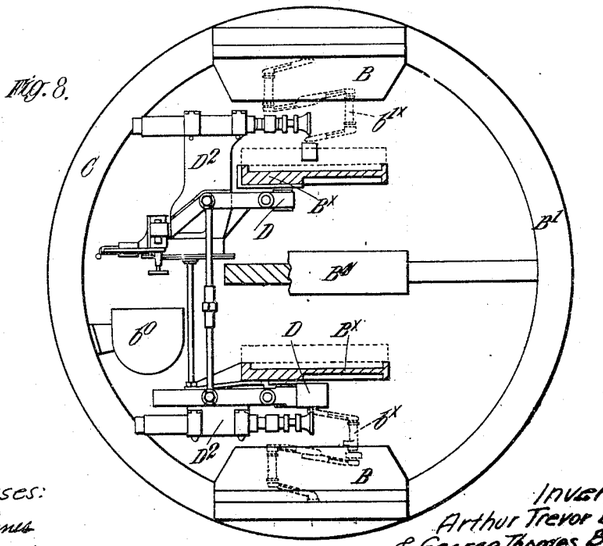
Figure 9:
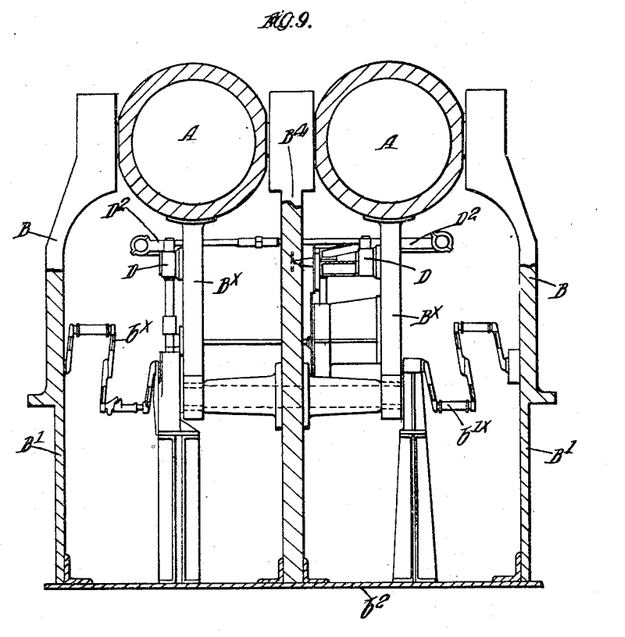

In the construction shown in Figs. 7 to 9, the sighting apparatus is at the front of the cradle, underneath the trunnions, and the sight setter is seated inside the chamber B' the seat $b^0$ being provided for this purpose. This arrangement enables a sighting apparatus of considerably reduced length to be used, and is very advantageous inasmuch as that the three numbers who are working the mounting and sights can readily communicate verbally with one another. In this arrangement the sight brackets instead of being pivoted on the cradle trunnions are pivoted to the elevating racks $B^x$, and in consequence the carriage cheeks closely fit the cradle; the other advantages possessed by the form of sighting apparatus shown in Figs. 1 to 3, and Figs. 5 and 6 are also obtained. It is to be understood that either form of sighting apparatus may be used with any of the herein described mountings whether adapted to carry one or more than one gun.

In the construction shown in Figs. 5 to 9 the mounting is provided with a center plate $B^4$ to receive the inner trunnions of the cradles, and the elevating hand wheel $b^x$ serves to elevate both guns simultaneously although they can be arranged to be elevated independently if desired. The guns may also be fired simultaneously or separately. In the form of the mounting illustrated in Fig. 4 which shows a mounting of the upper deck type, shields or screens C' are provided on the side cheeks to protect the gunners from spray. When a pair of guns are arranged on a mounting of this type, the shield need be no larger than that required with a single gun on a mounting constructed in accordance with present day practice.

Figure 12:
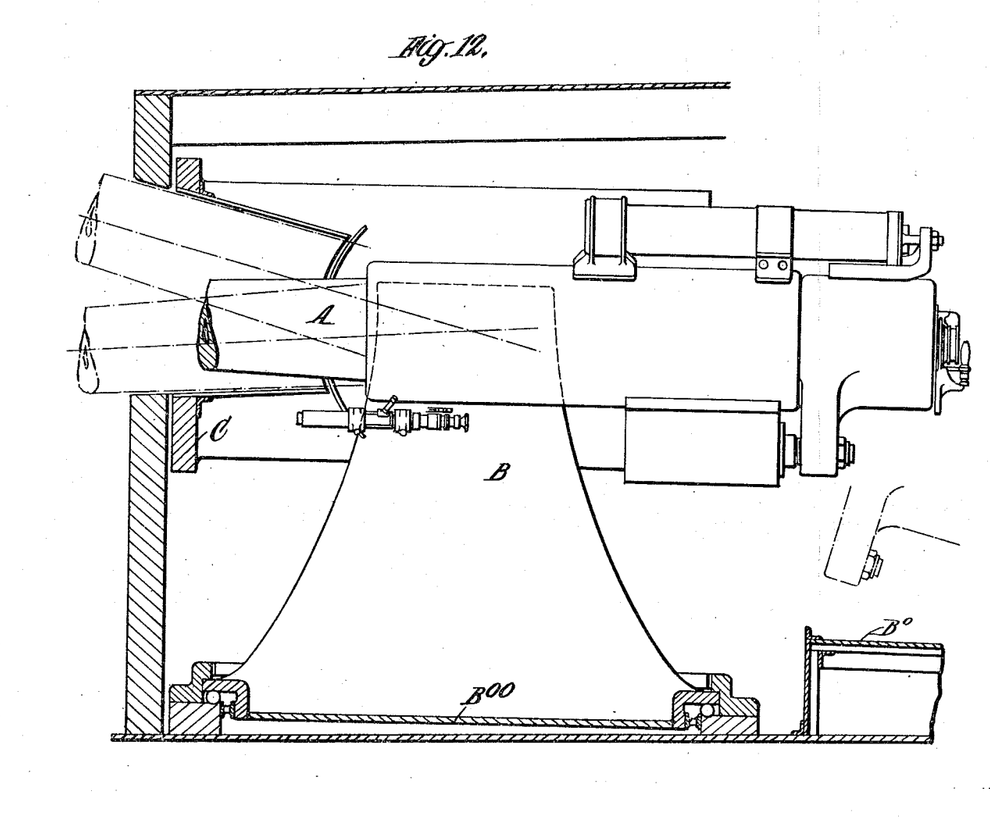
Figs. 12 and 13 are views similar to Figs. 7 and 9 showing still another form of mounting.
Figure 13:
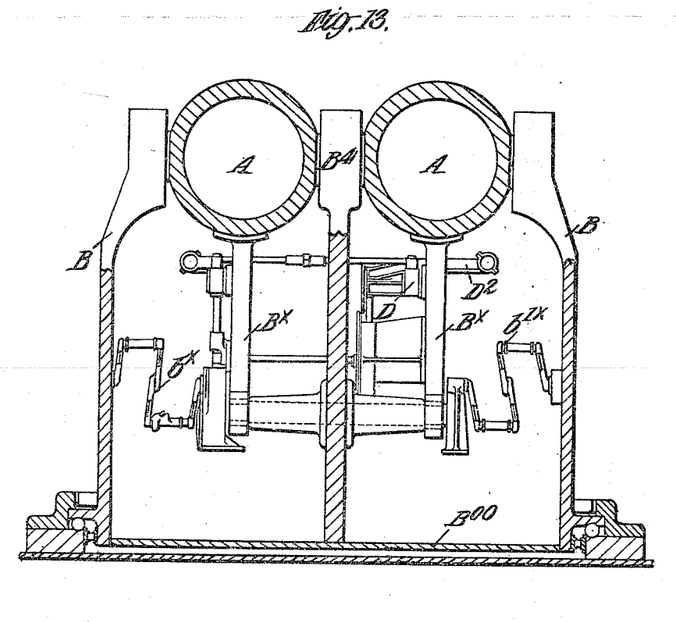

In Figs. 10 and 11 which as aforesaid show the cylindrical chamber or hollow pivot B' stationary instead of moving with the carriage, the latter is supported on roller, ball or other suitable bearings at the upper end of the chamber B', the carriage being preferably connected to a ring $B^5$ rotating upon the said bearings. In this arrangement seats need not be provided for the elevating and training numbers who would then walk around in the chamber during training. The said stationary cylindrical chamber may be dispensed with by raising the mounting sufficiently high to enable the gun layers to be accommodated above the deck as shown in Figs. 12 and 13; in this case a platform $B^0$ would be provided on the deck to enable the gun to be loaded. In the construction shown in these figures a platform $B^{00}$ integral with or connected to the carriage is provided, but this platform may be dispensed with in which event the elevating and training numbers would stand upon the deck within the side cheeks of the carriage and walk on this portion of the deck during the training movements.

The arrangement whereby the eyepiece or eyepieces of the sight or sights, the actuating gear of the elevating mechanism and the actuating gear of the training mechanism are disposed between the side cheeks of the carriage in itself constitutes an important feature of the invention.

What we claim and desire to secure by Letters Patent of the United States is:—

1. In a gun mounting, the combination with the carriage, of a shield whose diameter or width does not materially exceed the maximum width of the carriage, said carriage having downwardly extending side cheeks between which in a position beneath the level of the trunnions, the elevating and training number or numbers are situated at all angles of elevation of the gun, elevating mechanism and means for arranging said elevating mechanism so that its handle is between the side cheeks and beneath the level of the gun trunnions.

2. In a gun mounting, the combination with the carriage, and the sighting apparatus, said carriage having downwardly extending side cheeks, of means for mounting the sighting apparatus so that the eye piece of the sight is between these side cheeks and beneath the level of the gun trunnions.

3. In a gun mounting, the combination with the carriage and the elevating and training mechanisms, said carriage having downwardly extending side cheeks, of means for arranging said elevating and training mechanisms so that their handles are situated between the side cheeks and beneath the level of the gun trunnions.

4. In a gun mounting, the combination with the carriage, the sighting apparatus and the elevating and training mechanisms, said carriage having downwardly extending side cheeks, of means for arranging said sighting apparatus so that the eye piece of the sight is between the said side cheeks and beneath the level of the gun trunnions and means for arranging said elevating and training mechanisms so that their handles are between the side cheeks and beneath the level of the gun trunnions.

5. In a gun mounting, the combination with the carriage and the sighting apparatus, said carriage having downwardly extending side cheeks, of a working chamber moving with said side cheeks, a bearing for supporting said chamber, and means for mounting said sighting apparatus so that the eye piece of the sight is between the said side cheeks and beneath the level of the gun trunnions.

6. In a gun mounting of the naval type, the combination with the carriage and the sighting apparatus, said carriage having downwardly extending side cheeks, of a working chamber moving with said side cheeks, a bearing for supporting said chamber beneath the level of the deck, and means for mounting said sighting apparatus so that the eye piece of the sight is between the said side cheeks and beneath the level of the gun trunnions.

7. In a gun mounting, the combination with the carriage and the sighting apparatus, said carriage having downwardly extending side cheeks, of a sight bracket forming part of said sighting apparatus, and means for pivotally mounting said sight bracket on one of the gun trunnions in a position between the gun cradle and one of the side cheeks.

8. In a gun mounting, the combination with the carriage and the sighting apparatus, said carriage having downwardly extending side cheeks, of two connected sight brackets forming part of said sighting apparatus and means for pivotally mounting each sight bracket on one of the gun trunnions between the gun cradle and the contiguous side cheek.

In testimony whereof we affix our signatures in the presence of two witnesses.

ARTHUR TREVOR DAWSON.
GEORGE THOMAS BUCKHAM.

Witnesses:
  HENRY KING,
  ERNEST E. LARKINS.